(12) United States Patent
Glejbøl

(10) Patent No.: US 9,057,465 B2
(45) Date of Patent: Jun. 16, 2015

(54) UNBONDED, FLEXIBLE PIPE

(75) Inventor: Kristian Glejbøl, Glostrup (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 362 days.

(21) Appl. No.: 13/518,916

(22) PCT Filed: Dec. 3, 2010

(86) PCT No.: PCT/DK2010/050331
§ 371 (c)(1),
(2), (4) Date: Jul. 3, 2012

(87) PCT Pub. No.: WO2011/079845
PCT Pub. Date: Jul. 7, 2011

(65) Prior Publication Data
US 2012/0261019 A1  Oct. 18, 2012

(30) Foreign Application Priority Data
Dec. 28, 2009  (DK) .................................. 2009 01379

(51) Int. Cl.
*F16L 11/00* (2006.01)
*F16L 11/08* (2006.01)

(52) U.S. Cl.
CPC ...................................... *F16L 11/08* (2013.01)

(58) Field of Classification Search
CPC ....... F16L 59/12; F16L 59/143; F16L 59/147; F16L 59/153
USPC .......................... 138/125, 129, 134, 147, 149
See application file for complete search history.

(56) References Cited

U.S. PATENT DOCUMENTS

| | | | |
|---|---|---|---|
| 3,311,133 A | 3/1967 | Kinander | |
| 3,687,169 A | 8/1972 | Reynard | |
| 3,858,616 A | 1/1975 | Thiery et al. | |
| 4,549,581 A | 10/1985 | Unno et al. | |
| 4,673,002 A * | 6/1987 | Scanlon et al. | ............... 138/149 |
| 4,706,713 A | 11/1987 | Sadamitsu et al. | |
| 5,176,179 A | 1/1993 | Bournazel et al. | |
| 5,213,637 A | 5/1993 | Mallen Herrero et al. | |
| 5,407,744 A | 4/1995 | Mallen Herrero et al. | |
| 5,601,893 A | 2/1997 | Strassel et al. | |
| 5,645,109 A | 7/1997 | Herrero et al. | |

(Continued)

FOREIGN PATENT DOCUMENTS

| | | |
|---|---|---|
| EP | 0400689 A1 | 12/1990 |
| WO | 0161232 A1 | 8/2001 |

(Continued)

OTHER PUBLICATIONS

"Recommended Practice for Flexible Pipe"; API Recommended Practice 17B; Third Edition; Mar. 2002.

*Primary Examiner* — Paul R Durand
*Assistant Examiner* — Vishal Pancholi
(74) *Attorney, Agent, or Firm* — Pearne & Gordon LLP

(57) ABSTRACT

The invention relates to an unbonded, flexible pipe having a length and comprising a tubular inner sealing sheath, at least one metal armor layer and an outer sealing sheath. The unbonded, flexible pipe comprises at least one insulated length section comprising a fluid permeable thermally insulating cover surrounding the outer sealing sheath in the insulated length section. The thermally insulating cover is further surrounded by a liquid permeable jacket, and preferably the thermally insulating cover is liquid permeable.

25 Claims, 1 Drawing Sheet

(56) References Cited

U.S. PATENT DOCUMENTS

| | | | |
|---|---|---|---|
| 5,669,420 A | 9/1997 | Herrero et al. | |
| 5,730,188 A | 3/1998 | Kalman et al. | |
| 5,813,439 A | 9/1998 | Herrero et al. | |
| 5,837,083 A | 11/1998 | Booth | |
| 5,922,149 A | 7/1999 | Mallen Herrero et al. | |
| 6,000,438 A * | 12/1999 | Ohrn | 138/149 |
| 6,016,847 A | 1/2000 | Jung et al. | |
| 6,065,501 A | 5/2000 | Feret et al. | |
| 6,085,799 A | 7/2000 | Kodaissi et al. | |
| 6,123,114 A | 9/2000 | Seguin et al. | |
| 6,145,546 A | 11/2000 | Hardy et al. | |
| 6,192,941 B1 | 2/2001 | Mallen-Herrero et al. | |
| 6,253,793 B1 | 7/2001 | Dupoiron et al. | |
| 6,283,161 B1 | 9/2001 | Feret et al. | |
| 6,291,079 B1 | 9/2001 | Mallen Herrero et al. | |
| 6,354,333 B1 | 3/2002 | Dupoiron et al. | |
| 6,382,681 B1 | 5/2002 | Berton et al. | |
| 6,390,141 B1 | 5/2002 | Fisher et al. | |
| 6,401,760 B2 * | 6/2002 | Espinasse | 138/135 |
| 6,408,891 B1 | 6/2002 | Jung et al. | |
| 6,415,825 B1 | 7/2002 | Dupoiron et al. | |
| 6,454,897 B1 | 9/2002 | Morand | |
| 6,516,833 B1 | 2/2003 | Witz et al. | |
| 6,530,137 B1 | 3/2003 | Dewimille et al. | |
| 6,635,322 B1 * | 10/2003 | Korsgaard | 428/34.5 |
| 6,668,866 B2 * | 12/2003 | Glejbol et al. | 138/134 |
| 6,668,867 B2 | 12/2003 | Espinasse et al. | |
| 6,691,743 B2 | 2/2004 | Espinasse | |
| 6,739,355 B2 | 5/2004 | Glejbol et al. | |
| 6,840,286 B2 | 1/2005 | Espinasse et al. | |
| 6,889,717 B2 | 5/2005 | Coutarel et al. | |
| 6,889,718 B2 | 5/2005 | Glejbol et al. | |
| 6,904,939 B2 | 6/2005 | Jung et al. | |
| 6,978,806 B2 | 12/2005 | Glejbol et al. | |
| 6,981,526 B2 | 1/2006 | Glejbol et al. | |
| 7,032,623 B2 | 4/2006 | Averbuch et al. | |
| 7,311,123 B2 | 12/2007 | Espinasse et al. | |
| 7,347,226 B2 * | 3/2008 | Colbachini | 138/126 |
| 2003/0102044 A1 | 6/2003 | Coutarel et al. | |
| 2004/0194838 A1 * | 10/2004 | Glejbol et al. | 138/134 |
| 2005/0050083 A1 | 3/2005 | Jin et al. | |
| 2005/0241717 A1 | 11/2005 | Hallot et al. | |
| 2006/0048833 A1 | 3/2006 | Glejbol et al. | |
| 2006/0182943 A1 | 8/2006 | Eyhorn | |
| 2009/0101225 A1 | 4/2009 | Buchner | |

FOREIGN PATENT DOCUMENTS

| | | |
|---|---|---|
| WO | 0216733 A1 | 2/2002 |
| WO | 03044414 A1 | 5/2003 |
| WO | 2008025893 A1 | 3/2008 |
| WO | 2008077409 A1 | 7/2008 |
| WO | 2008077410 A1 | 7/2008 |
| WO | 2009024156 A2 | 2/2009 |
| WO | 2010096935 A1 | 9/2010 |

* cited by examiner

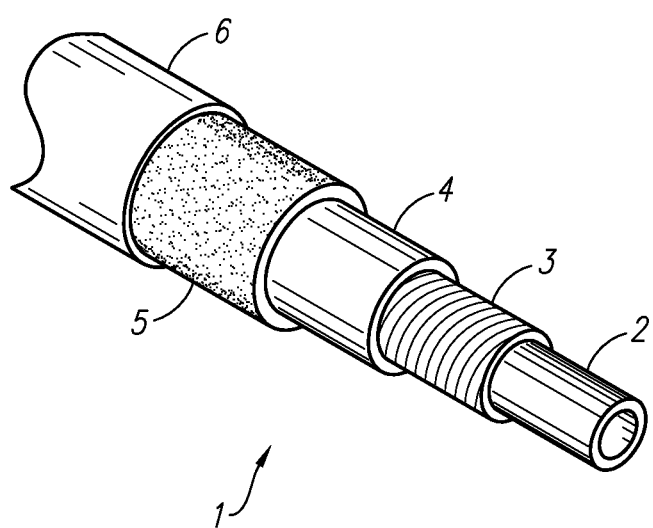

UNBONDED, FLEXIBLE PIPE

TECHNICAL FIELD

The invention relates to an unbonded, flexible pipe in particular for transportation of hydrocarbons and/or for an umbilical as well as a method for producing such pipe.

BACKGROUND ART

Flexible pipes of the present type are well known in the art in particular for offshore transportation of fluids. Such pipes usually comprise an inner liner, also often called an inner sealing sheath or an inner sheath, which forms a barrier against the outflow of the fluid which is conveyed through the pipe, and one or more armoring layers e.g. of metal, such as steel on the outer side of the inner liner (outer armoring layer(s)). The flexible pipe usually comprises an outer sheath provided with the object of forming a barrier against the ingress of fluids from the pipe surroundings to the armor layers.

Typical unbonded flexible pipes are e.g. disclosed in WO0161232A1, U.S. Pat. Nos. 6,123,114 and 6,085,799.

In order to have sufficient strength, in particular to prevent the collapse of the inner sealing sheath, the flexible pipe may for certain applications comprise an armor layer located inside the space defined by the inner sealing sheath. Such inner armoring layer or layers are normally referred to as a carcass.

In this text the term "unbonded" means that at least two of the layers including the armoring layers and polymer layers are not bonded to each other. In practice the known unbonded, flexible pipe normally comprises at least two armoring layers located outside the inner sealing sheath, which armoring layers are not bonded to each other neither directly nor indirectly via other layers along the pipe. The pipe layers can therefore move with respect to each other, and thereby the pipe becomes bendable and sufficiently flexible to roll up for transportation and to withstand the high mechanical forces it may be subjected to in use.

The above-mentioned type of unbonded, flexible pipes is used for dynamic as well as for static offshore applications for the transport of fluids and gases, in particular crude oil and gasses.

Transportation of crude oil and gas products often results in difficulties due to the lack of control of the temperature. If the temperature is too high, the polymer materials of the flexible pipe may degrade, and if the temperature is too low, a number of undesired effects have been observed including

- undesired increase in viscosity, which reduces the flow rate in the pipe;
- precipitation of dissolved paraffin and/or flocculation of asphaltenes which then increases the viscosity of the product, and
- once deposited can reduce the effective inside diameter of the pipe; and
- obstruction of the pipe due to sudden, compact, and massive formation of gas hydrates which precipitate at high pressure and low temperature.

It is well known to seek to avoid some of the undesired effects by using flexible pipes with thermal insulations thereby reducing heat loss of fluids flowing in the bore of the pipes e.g. as described in U.S. Pat. No. 6,530,137, US20090101225 and EP0400689

U.S. Pat. No. 6,530,137 describes a heat-insulated flexible pipe comprising at least one layer of rigid and extruded insulating material on the outside of said pipe. The layer comprises means for restoring the flexibility of the insulated pipe in the form of at least one circumferential slot.

US20090101225 describes a flexible pipe body and a method of providing a flexible pipe is disclosed. The flexible pipe body includes a fluid retaining layer, at least one tensile armor layer, at least one extruded thermal insulation layer over an outermost one of the at least one tensile armor layers and an outer shield layer over the insulation layer.

EP 0400689B1 describes a thermally insulating structure around a central or tube core. It comprises, around the said internal or tube core, a plurality of annular partitions, distributed along the length of the core and integral with this, a thermally insulating material filling the annular chambers in between the front faces of the successive partitions and the outer covering of the inner core, and a continuous, extruded, outer sheath.

The object of the invention is to provide an insulated, unbonded, flexible pipe which is simple to prepare, can be prepared in a cost-effective manner and has an effective insulation which simultaneously does not result in an unacceptable reduction of the flexibility of the pipe.

DISCLOSURE OF INVENTION

The flexible pipe of the invention is as defined in the claims. According to the invention a new type of insulated flexible pipes has been provided. The flexible pipe of the invention comprises an axis and a tubular inner sealing sheath surrounding said axis, said inner sealing sheath is surrounded by at least one outer armoring layer. The inner sealing sheath has an inner side which is the side of the inner sealing sheath facing said axis. In other words, all that is surrounded by the inner sealing sheath is on the inner side of the inner sealing sheath.

In the following the term "length of the pipe" is used to mean the length along the axis of the pipe. The space inside the inner sealing sheath is also referred to as the bore of the pipe.

The terms "axial direction" or "axially" are used to mean the direction along the length of an axis of the pipe. Generally it is desired that the flexible pipe is substantially circular in cross sectional shape, however, it should be understood the flexible pipes could have other cross sectional shapes such an oval, elliptical or slightly angular (angular with rounded edges). The axis of the flexible pipes may in such situations be determined as the most central axis in the bore of the flexible pipe. The terms "outside" and "inside" a member and/or a layer are used to mean "outside, respectively inside said member and/or a layer in radial direction from, and perpendicular to the axis of the pipe and radially out towards an outermost surface of the pipe".

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The unbonded, flexible pipe 1 of the invention has a length and comprises a tubular inner sealing sheath 2, at least one metal armor layer 3 and an outer sealing sheath 4. The unbonded, flexible pipe comprises at least one insulated length section, which insulated length section comprises a fluid permeable thermally insulating cover 5 surrounding the outer sealing sheath in the insulated length section and further the thermally insulating cover is surrounded by a liquid permeable jacket 6.

The flexible pipe of the invention is an unbonded pipe meaning that at least two layers of the pipe are not bonded to each other but may move with respect to each other. In a preferred embodiment the flexible pipe of the invention comprises at least two metal armoring layers which are not bonded to each other but can move with respect to each other. As it is well known an anti-wear layer may be applied between the metal armoring layers to reduce friction and thereby ensure that they can move relatively easy with respect to each other. Anti-wear layers, their use and useful materials are e.g. described in Recommended Practice for Flexible Pipe API 17B, March 2002.

The configuration of armoring layers is well known in the art and the flexible pipe of the invention may have any armoring structure, such as the armoring structures known from prior art e.g. comprising a pressure armor of wound wires with a relatively high angle to the pipe axis e.g. about 80 degrees or more and a pair of tensile armor layers e.g. cross wound with angles below 55 degree. Examples or armors and profiles thereof are e.g. the armors described in any one of U.S. Pat. Nos. 5,176,179, 5,813,439, 3,311,133, 3,687,169, 3,858,616, 4,549,581, 4,706,713, 5,213,637, 5,407,744, 5,601,893, 5,645,109, 5,669,420, 5,730,188, 5,730,188, 5,813,439, 5,837,083, 5,922,149, 6,016,847, 6,065,501, 6,145,546, 6,192,941, 6,253,793, 6,283,161, 6,291,079, 6,354,333, 6,382,681, 6,390,141, 6,408,891, 6,415,825, 6,454,897, 6,516,833, 6,668,867, 6,691,743, 6,739,355, 6,840,286, 6,889,717, 6,889,718, 6,904,939, 6,978,806, 6,981,526, 7,032,623, 7,311,123, 7,487,803, 23,102,044, WO 28025893, WO 2009024156, WO 2008077410 and WO 2008077409.

In one embodiment the unbonded, flexible pipe is constructed such than when applying the unbonded, flexible pipe in water at a hydrostatic pressure of at least 500 psi, the thermally insulating cover is wetted e.g. within 5 hours, such as within 1 hour.

The unbonded, flexible pipe should preferably be constructed such than when applying the unbonded, flexible pipe in water at a hydrostatic pressure of at least 500 psi, the pressure in the thermally insulating is substantially equalized with the ambient e.g. within 5 hours, such as within 1 hour.

In practice it is preferred that the liquid permeable jacket is sufficiently liquid permeable to provide that substantially all interfaces between the liquid permeable jacket and the thermally insulating cover are wetted when the unbonded, flexible pipe is used in subsea applications. The time of wetting from applying the unbonded, flexible pipe subsea to wetting of the liquid permeable jacket-thermally insulating cover interface may e.g. be up to about 24 hours, such as up to about 5 hours, such as up to about 1 hour. The liquid permeable jacket preferably is sufficiently liquid permeable to equalize the hydrostatic pressure in the liquid permeable jacket-thermally insulating cover interface with the pressure of the immediate ambient water when the unbonded, flexible pipe is in use in subsea applications.

Hereforto insulated flexible pipes have always been provided with substantially dry insulations. In the present invention the insulation in the form of the thermally insulating cover is kept wet. This has been found to have a number of advantages which have not been observed until now. Because the liquid permeable jacket is liquid permeable, no substantial external pressure will act on the liquid permeable jacket, and accordingly the liquid permeable jacket will substantially not carry any pressure induced forces further to the thermally insulating cover. The unbonded, flexible pipe will thereby be more flexible than corresponding insulated prior art unbonded, flexible pipes with a non-liquid permeable jacket.

Furthermore the liquid permeable jacket need not have a high strength and thickness because the only purpose of the liquid permeable jacket is to provide a mechanical protection of the thermally insulating cover to protect it from being damaged during lay out and in case of collision with other elements e.g. other pipes. Furthermore the liquid permeable jacket can be applied in a very simple way and it can be provided with perforations which allow the unbonded, flexible pipe to be even more flexible.

Furthermore due to the liquid permeability of the liquid permeable jacket, there will be substantially no risk of creep of the liquid permeable jacket.

Further any the temperature difference over the outer sealing sheath may be reduced and accordingly the risk of formation of condense on the inner side of the outer sealing sheath may be reduced.

Furthermore it has been found that by using a liquid permeable liquid permeable jacket as in the present invention, risks of local deformations and/or delocalization of the thermally insulating cover have been highly reduced.

In one embodiment also the thermally insulating cover is liquid permeable. The thermally insulating cover may for example have a liquid permeability which up to about the liquid permeability of the liquid permeable jacket.

In one embodiment the thermally insulating cover has a liquid permeability higher than the liquid permeability of the liquid permeable jacket.

It has been found that in situations where water penetrates in between the outer sealing sheath and the thermally insulating cover, the heat capacity of the flexible transporting unit may be increased and accordingly provides an extra security against cooling below a desired set-point.

In one embodiment the liquid permeable jacket and the thermally insulating cover are sufficiently liquid permeable to equalize the hydrostatic pressure between the thermally insulating cover and the liquid permeable jacket with the pressure of the immediate ambient water when the unbonded, flexible pipe is in use in subsea applications.

In one embodiment the thermally insulating cover and the liquid permeable jacket are sufficiently permeable to allow water to penetrate at least partly into the thermally insulating cover when the flexible pipe is applied in water (e.g. in subsea applications) to thereby substantially equalize the hydrostatic pressure between the thermally insulating cover and the immediate ambient pressure, preferably the thermally insulating cover and the liquid permeable jacket are sufficiently permeable to allow water to penetrate into the surface of the outer sealing sheath when subjected to a hydrostatic pressure of at least 500 psi, preferably the thermally insulating cover and the liquid permeable jacket are sufficiently permeable to allow water to penetrate into the surface of the outer sealing sheath when subjected to a hydrostatic pressure of at least 100 psi.

In one embodiment the liquid permeable jacket has a liquid permeability which is at least as high as the liquid permeability of the thermally insulating cover, the liquid permeable jacket preferably has a liquid permeability which is substantially higher than the liquid permeability of the thermally insulating cover, more preferably the liquid permeable jacket has a liquid permeability which is sufficiently high to not result in any substantial barrier against ingress of water to the thermally insulating cover.

The thermally insulating cover may be of any material which can provide a thermally insulating effect. The thermally insulating cover is preferably of a material with a substantially lower thermal conductivity than the material of the outer sealing sheath. In one embodiment the thermally insulating cover is preferably of a material with a substantially lower thermal conductivity than the material of the liquid permeable jacket.

In one embodiment the thermally insulating cover is of a material with thermal conductivity in dry condition of about 0.5 W/(mK) or less, such as about 0.3 W/(mK) or less, such as about 0.15 W/(mK) or less.

In one embodiment the material of the thermally insulating cover comprises a thermoplastic polymer.

In one embodiment the thermally insulating cover comprises a polyolefine, such as polypropylene or a polypropylene co-polymer.

Other examples of materials which may be comprised in the cover comprise one or more of the materials polyolefins, e.g. polyethylene or poly propylene; polyamide, e.g. poly amide-imide, polyamide-11 (PA-11), polyamide-12 (PA-12) or polyamide-6 (PA-6)); polyimide (PI); polyurethanes; polyureas; polyesters; polyacetals; polyethers, e.g. polyether sulphone (PES); polyoxides; polysulfides, e.g. polyphenylene sulphide (PPS); polysulphones, e.g. polyarylsulphone (PAS); polyacrylates; polyethylene terephthalate (PET); polyetherether-ketones (PEEK); polyvinyls; polyacrylonitrils; polyetherketoneketone (PEKK); copolymers of the preceding; fluorous polymers e.g. polyvinylidene difluoride (PVDF), homopolymers or copolymers of vinylidene fluoride ("VF2"), homopolymers or copolymers of trifluoroethylene ("VF3"), copolymers or terpolymers comprising two or more different members selected from VF2, VF3, chlorotrifluoroethylene, tetrafluoroethylene, hexafluoropropene, or hexafluoroethylene; compounds comprising one or more of the above mentioned polymers, and composite materials, such as a polymer (e.g. one of the above mentioned) compounded with reinforcement fibers, such as glass-fibers, glass-beads, carbon-fibers and/or aramide fibers.

The polymer materials may be foamed or non-foamed or any combinations thereof. The thermally insulating cover may e.g. be of a flowable material e.g. a fluidic material, flowable foam material (flowable pieces of foamed polymer) and/or flowable fluff of polymer (flowable pieces of polymer with crumpled shape), where the flowable material is encapsulated in a polymer casing which is applied around the outer sealing sheath. The casing is preferably not liquid permeable, but preferably the casing is arranged in windings and/or comprises apertures—not providing liquid access to the flowable material, such that liquid can reach the outer sealing sheath.

In one embodiment the thermally insulating cover comprises at least one phase-change material. Phase-change materials are well known materials, and can provide the unbonded, flexible pipe with an extra security against cooling below a desired temperature. Simultaneously the phase-change material may in one embodiment provide an extra security against overheating. Examples of phase-change material are for example described in WO 02/16733, US 2005/0241717 and US 2005/050083.

The phase-change material may for example be selected to have a melting point which is below a selected flow temperature of a fluid to be transported in the pipe, but above a set point temperature, so in case of cooling down of a fluid in the flexible transporting unit, e.g. due to a temporary stop of flow in the unbonded, flexible pipe the melted phase-change material will start cooling down, until it reaches the set-point. At this set-point the temperature will remain stable until the phase-change material has changed to a solid phase.

The set-point may preferably be close to but above the temperature at which hydrates will form.

In one embodiment the phase-change material has a phase change within the temperature interval from about 20° C. to about 150° C., such as from about 30° C. to about 5 degrees less than the softening temperature of the outer sealing sheath, such as from about 40° C. to about 130° C., such as from about 50° C. to about 100° C.

In one embodiment the thermally insulating cover comprises at least one phase-change material having a melting point which is higher than the temperature at which hydrate formation occurs and lower than a temperature $T_{max}$ which is the max temperature of fluid that can be transported by the flexible pipe, preferably the phase-change material has a melting point which is at least about 5 degrees higher than the temperature at which hydrate formation occurs and at least about 5 degrees lower than a temperature $T_{max}$.

Any phase-change material with a relevant temperature of phase-change may be used. In one embodiment the thermally insulating cover comprises at least one phase-change material comprising at least one chemical compound of the alkane family, preferably a paraffin having a hydrocarbon chain with at least 14 carbon atoms, more preferably one or more of tetracosane of formula $C_{24}H_{50}$ presenting a melting temperature of about 50° C. and heptacosane of formula $C_{17}H_{36}$ presenting a melting temperature of about 50° C.

In one embodiment the thermally insulating cover comprises a phase-change material containing composition comprising a first compound consisting of a hydrocarbon or a mixture of hydrocarbons such as paraffin or gas oil, mixed with a second structure providing compound, such as a gelling compound and/or a cross-linked compound, such as a second compound of the polyurethane type, cross-linked polypropylene, cross-linked polyethylene, or silicone, preferably the first compound is in the form of particles or microcapsules dispersed within a matrix of the second compound, and the first compound preferably being selected from alkanes such as paraffins, waxes, bitumens, tar, fatty alcohols, or glycols, more preferably the first compound being a phase-change compound.

In order for the phase-change material not to flow out of the unbonded, flexible pipe the phase-change material and/or the phase-change material containing composition is in one embodiment contained in one or more insulating elements impervious to the phase-change material and/or phase-change material containing composition. The one or more insulating elements are arranged around the outer sealing sheath to constitute at least a part of the thermally insulating cover. In one embodiment the one or more insulating elements preferably are in the form of a polymer casing comprising the phase-change material and/or the phase-change material containing composition.

Since the phase-change material may change density when changing phase, it is desired that the casing is sufficiently elastic to allow volume expansion upon phase change of the phase change material, preferably such that no damaging pressure will build up inside the thermally insulating element (s).

The thermally insulating element(s) may for example be shaped as one or more elongate elements wound onto the outer sealing sheath such that water can penetrate between windings into the outer surface of the outer sealing sheath.

The thermally insulating cover may additionally comprise filler and additives. In one embodiment the thermally insulating cover comprises a polymer comprising up to about 20% by weight, such as up to about 15% by weight, such as about 10% by weight, such as up to about 5% by weight of inorganic filler, based upon the total weight of the polymer material, the inorganic filler may for example comprise one or more of pigments; heat stabilisers; process stabilisers; metal deactivators, flame-retardants; clay silicates e.g. kaolinite, such as dickite, halloysite, nacrite and serpentine; smectite, such as pyrophyllite, talc, vermiculite, sauconite, saponite, nontronite hectorites (magnesiosilicates) and montmorillonite (bentonite); Illite; chlorite; and synthetic clays, such as hydrotalcite; and/or reinforcement fillers e.g. glass particles, glass fibres, mineral fibres, talcum, carbon, carbonates, silicates, and metal particles.

The thermally insulating cover may be provided in one or more layers, which may be of equal or different materials.

In one embodiment the thermally insulating cover comprises a single insulating layer.

In one embodiment the thermally insulating cover comprises a plurality of insulating layers of equal or different material(s).

Since the thermally insulating cover need not be liquid impermeable, and preferably is liquid impermeable, the thermally insulating cover may in principle be provided by any method. The thermally insulating cover is accordingly simple to produce e.g. using equipment which normally is available in unbonded, flexible pipe factories.

In one embodiment the thermally insulating cover comprises an extruded insulating layer, a wound insulating layer and/or a folded insulating layer.

In one embodiment the thermally insulating cover comprises at least one perforated insulating layer In one embodiment the thermal insulating cover comprises one or more layers of wound profiles which may or may not be interlocked. The one or more wound profiles may be provided by any method.

In one embodiment the thermal insulating cover comprises one or more layers of wound profiles produced by extrusion.

In one embodiment the thermal insulating cover comprises one or more layers of wound profiles produced by extrusion, wherein at least one of the profiles comprises at least one strength imparting member, the strength imparting member providing the profile(s) with an increased strength in at least one direction.

The strength imparting member is preferably of a material with a higher strength, such as a higher flexural strength than the material of the remaining part to the wound profile.

In one embodiment the at least one strength imparting member is an elongate member, which optionally in integrated in the wound profile, in a part of or its whole length.

In one embodiment the thermal insulating cover comprises one or more layers of wound profiles produced by extrusion, wherein at least one of the profiles comprising an elongated strength imparting member, where the member made from steel, titanium, aramid, polyamide, polyester or any combinations thereof.

The purpose of the liquid permeable jacket is—as mentioned above—primarily to mechanically protect the thermally insulating cover. It is accordingly preferred that the liquid permeable jacket is of a material with a good mechanical strength, such as a good strength against tearing.

Examples of useful materials for the liquid permeable jacket comprise one or more of the materials polyolefins, e.g. polyethylene or poly propylene; polyamide, e.g. poly amide-imide, polyamide-11 (PA-11), polyamide-12 (PA-12) or polyamide-6 (PA-6)); polyimide (PI); polyurethanes; polyureas; compounds comprising one or more of the above mentioned polymers, and composite materials, such as a polymer (e.g. one of the above mentioned) compounded with reinforcement fibers, such as glass-fibers, glass-beads, carbon-fibers and/or aramide fibers.

In one embodiment the jacket comprises a polymer comprising up to about 20% by weight, such as up to about 15% by weight, such as about 10% by weight, such as up to about 5% by weight of inorganic filler, based upon the total weight of the polymer material, the inorganic filler may for example comprise one or more of pigments; heat stabilizers; process stabilizers; metal deactivators, flame-retardants; clay silicates e.g. kaolinite, such as dickite, halloysite, nacrite and serpentine; smectite, such as pyrophyllite, talc, vermiculite, sauconite, saponite, nontronite hectorites (magnesiosilicates) and montmorillonite (bentonite); Illite; chlorite; and synthetic clays, such as hydrotalcite; and/or reinforcement fillers e.g. glass particles, glass fibres, mineral fibres, talcum, carbon, carbonates, silicates, and metal particles.

In one embodiment the jacket is of cross-linked polyethylene (PEX).

Also the jacket may be provided by any methods, such as by extrusion, winding or folding around the thermally insulating cover. In particular winding with textile is a simple method of providing the liquid permeable jacket.

The jacket may preferably be perforated to provide a desired permeability. In one embodiment the jacket comprises a plurality of perforations having a size of at least about 1 mm$^2$, such as at least about 5 mm$^2$, such as at least about 10 mm$^2$, such as at least about 50 mm$^2$, such as up to about 5 cm$^2$.

In one embodiment the thermally insulating cover and the jacket are non-foamed. Foamed materials are often rather sensible and the risk of the material being damaged within the lifetime of a flexible transporting unit—which is normally set to about 20 year—is relatively high compared with the risk of damaging non-foamed materials. Further by using the present invention it has been found that it is not necessary to use foamed materials.

The thermally insulating cover may in principle have any thickness, but naturally a certain thickness is required to provide a detectable thermal insulation. A minimum thermally insulating cover thickness of at least 3 mm is desired. In one embodiment the thermally insulating cover has a thermally insulating cover thickness of at least about 5 mm, such as at least about 10 mm, such as at least about 20 mm, such as at least about 50 mm, such as at least about 100 mm.

In one embodiment the outer sealing sheath has an outer sealing sheath thickness and the thermally insulating cover has a thermally insulating cover thickness, and the thermally insulating cover thickness is larger than the outer sealing sheath thickness. Preferably the thermally insulating cover thickness is at least about 50% larger, such as at least about 200% larger than the outer sealing sheath thickness.

In one embodiment the jacket has a jacket thickness and the thermally insulating cover has a thermally insulating cover thickness, the thermally insulating cover thickness is larger than the jacket thickness. Preferably the thermally insulating cover thickness is at least about 50% larger, such as at least about 100% larger than the jacket thickness.

Preferably the jacket and the thermally insulating cover are not completely bonded to each other along the length of the unbonded, flexible pipe and comprise a non-bonded interface such that water can penetrate into the non-bonded interface. It is desired that the liquid permeable jacket and the thermally insulating cover can move with respect to each other e.g. when the unbonded, flexible pipe is bent.

The thermally insulating cover may preferably be applied in direct contact with the outer sealing sheath. The outer sealing sheath and the thermally insulating cover are preferably not bonded to each other. It should be observed that intermediate layer or layers could be applied between the outer sealing sheath and the thermally insulating cover.

A highly beneficial property of the unbonded, flexible pipe of the present invention is that the thermally insulating cover and the liquid permeable jacket need not be applied in the whole length of the unbonded, flexible pipe, but can be applied merely in desired section or sections—in particular sections where cooling below a selected temperature (e.g. the temperature of hydrate formation) is at risk, whereas other sections of the unbonded, flexible pipe can remain non covered by insulation.

Since the liquid permeable jacket and optionally the thermally insulating cover are not liquid proof, there is no need to ensure a liquid tight sealing of these layers at the ends of the unbonded, flexible pipe and accordingly the unbonded, flexible pipe can have one or more insulated length sections which do not extend in the whole length of the unbonded, flexible pipe.

In one embodiment the insulated length section of the unbonded, flexible pipe has a length of at least about 50 m, such as at least about 100 m, such as at least about 500 m, such as at least about 1000 m. The length of the unbonded, flexible pipe may e.g. be up to 5000 m or longer, such as up to about 3000.

In one embodiment the insulated length section of the unbonded, flexible pipe has a length of up to about 90%, such as up to about 50%, such as up to 10% of the whole unbonded, flexible pipe.

In one embodiment the unbonded, flexible pipe comprises two or more insulated length sections with equal or different length, and/or insulating cover, and/or jacket.

The unbonded, flexible pipe comprises a first and a second end. The ends of the unbonded, flexible pipe are usually—for ensuring liquid tight sealing—terminated by being connected to an end fitting e.g. for connection with a structure, such as a subsea structure, a platform, a ship, another pipe or other elements. Since the pressure to which the individual layers of the unbonded, flexible pipe may be subjected can be very high and very different from each other, the individual layers are often mounted in the end fitting one by one. Generally the end fitting is a considerable cost factor of a flexible pipe system and also adds substantially to the weight of the pipe since it is usually necessary to provide the end fittings in metal. Generally the larger the outer diameter of the pipe is, the larger the end fitting should be and accordingly the more expensive and the higher the weight thereof.

Because the thermally insulating cover and/or the liquid permeable jacket of the unbonded, flexible pipe of the invention need not be mounted in any of the two end fittings, considerable cost reduction can be obtained because the outer diameter calculated with when designing the end fittings is the outer diameter of the outer sealing sheath and not of the thermally insulating cover or the liquid permeable jacket. Simultaneously the weight of the end fittings can be kept at a relatively low level.

In one embodiment the insulated length section and the thermally insulating cover have a first end closer to the first end of the unbonded, flexible pipe and a second end closer to the second end of the unbonded, flexible pipe, the first end of the thermally insulating cover being terminated at a distance from the first end of the unbonded, flexible pipe, preferably the second end of the thermally insulating cover is terminated at a distance from the second end of the unbonded, flexible pipe.

In one embodiment the jacket has a first end closer to the first end of the unbonded, flexible pipe and a second end closer to the second end of the unbonded, flexible pipe. The first end of the jacket is terminated at a distance from the first end of the unbonded, flexible pipe, and preferably the second end of the jacket is terminated at a distance from the second end of the unbonded, flexible pipe.

In one embodiment the jacket and the thermally insulating cover, respectively, have first ends closer to the first end of the unbonded, flexible pipe and second ends closer to the second end of the unbonded, flexible pipe. The jacket extends beyond the first and the second end of the thermally insulating cover, and the jacket optionally extends from the first to the second end of the unbonded, flexible pipe.

In one embodiment the insulated length section of the unbonded, flexible pipe constitutes substantially the whole length of the pipe.

In one embodiment the unbonded, flexible pipe comprises a first and a second end, at least one of the first and the second end is connected to an end fitting such that one or more of the layers of the unbonded, flexible pipe are independently fixed to the end fitting, and the outer sealing sheath is fixed to the end fitting in an end section of the outer sealing sheath. The thermally insulating cover and the jacket diverge from the outer sealing sheath at the end section of the outer sealing sheath.

In one embodiment at least one of the first and the second end of the unbonded, flexible pipe is/are connected to an end fitting such that one or more of the layers of the unbonded, flexible pipe are independently fixed to the end fitting. The thermally insulating cover is not fixed to provide a firm connection to the end fitting, preferably the jacket is not fixed to provide a firm connection to the end fitting.

In one embodiment the thermally insulating cover and the liquid permeable jacket are applied on site, i.e. after the remaining parts of the unbonded, flexible pipe have been provided and the unbonded, flexible pipe has been transported to the site of use. In one embodiment the thermally insulating cover and the liquid permeable jacket are applied by folding or winding onto the outer sealing sheath after the fabrication of the remaining parts of the pipe has been terminated.

EXAMPLES

In the following are a few specific examples of flexible transporting units according to the invention. The examples are merely illustrative of the invention and should in no way be interpreted to limit the scope of the invention.

| | Example 1-6 inch flowline |
|---|---|
| Length of pipe | About 3000 m |
| Inner diameter of pipe | About 16 cm |
| Insulated length section | About 1000 m - starting about 5 m from one end |
| Carcass | Steel carcass of interlocked, helically wound folded strips |
| Inner sealing | Extruded inner sealing of PA 11 - thickness about 5 mm |
| Pressure armor | Steel armoring of helically wound profiles with a winding angle to center axis of pipe of about 85 degrees |
| Tensile armor | A pair of Cross wound profiles with winding angles below 55 degrees |

-continued

| | |
|---|---|
| Outer sealing sheath | Extruded layer of PEX - thickness about 5 mm |
| Thermally insulating cover | Wound strips of PP - The layer is permeable to liquid. Total thickness about 10 mm |
| Liquid permeable jacket | A perforated, extruded layer of PEX - thickness about 2 mm |

Example 2-8 inch riser

| | |
|---|---|
| Length of pipe | About 1500 m |
| Inner diameter of pipe | About 20 cm |
| Insulated length section 1 | About 750 m - starting about 5 m from one end, insulated to $\lambda < 2$ $Wm^{-1}K^{-1}$ |
| Insulated length section 2 | About 750 m - starting about 755 m from one end, insulated to $\lambda < 4$ $Wm^{-1}K^{-1}$ |
| Carcass | Steel carcass of interlocked, helically wound folded strips |
| Inner sealing | Extruded inner sealing of PVDF - thickness about 8 mm |
| Pressure armor | Steel armoring of helically wound profiles with a winding angle to center axis of pipe of about 85 degrees |
| Tensile armor | A pair of Cross wound profiles with winding angles below 55 degrees |
| Outer sealing sheath | Extruded layer of PA11- thickness about 8 mm |
| Thermally insulating cover | Wound strips of PP - The layer is permeable to liquid. |
| Liquid permeable jacket | A wound layer of multiple Polyester textile tapes having a total thickness of 4 mm |

The invention claimed is:

1. An unbonded, flexible pipe having a length and comprising a tubular inner sealing sheath, at least one metal armor layer and an outer sealing sheath, said unbonded, flexible pipe comprises at least one insulated length section comprising a fluid permeable thermally insulating cover surrounding said outer sealing sheath in said insulated length section, said thermally insulating cover is surrounded by a liquid permeable jacket,
wherein said thermally insulating cover and said liquid permeable jacket are sufficiently permeable to allow water to penetrate into the thermally insulating cover when the flexible pipe is applied in water to thereby substantially equalize the hydrostatic pressure between the thermally insulating cover and the immediate ambient pressure.

2. The unbonded, flexible pipe as claimed in claim 1, wherein said thermally insulating cover is liquid permeable.

3. The unbonded, flexible pipe as claimed in claim 1, wherein said liquid permeable jacket has a liquid permeability which is at least as high as the liquid permeability of the thermally insulating cover.

4. The unbonded, flexible pipe as claimed in claim 1, wherein said thermally insulating cover comprises at least one phase-change material having a phase change within the temperature interval from about 20° C. to about 150° C.

5. The unbonded, flexible pipe as claimed in claim 1, wherein said thermally insulating cover comprises at least one phase-change material comprising at least one chemical compound of the alkane family.

6. The unbonded, flexible pipe as claimed in claim 1, wherein said thermally insulating cover comprises a phase-change material containing composition comprising a first compound consisting of a hydrocarbon or a mixture of hydrocarbons mixed with a second structure providing compound.

7. The unbonded, flexible pipe as claimed in claim 4, wherein said phase-change material is contained in one or more insulating elements impervious to said phase-change material, said one or more insulating elements being arranged around said outer sealing sheath to constitute at least a part of said thermally insulating cover.

8. The unbonded, flexible pipe as claimed in claim 7, wherein said thermally insulating cover comprises a polymer comprising up to about 20% by weight inorganic filler.

9. The unbonded, flexible pipe as claimed in claim 1, wherein said thermally insulating cover comprises at least one perforated insulating layer.

10. The unbonded, flexible pipe as claimed in claim 1, wherein said jacket comprises one or more of the materials polyolefins; polyamide;
polyurethanes; polyureas; compounds comprising one or more of the above mentioned polymers, and composite materials compounded with reinforcement fibers.

11. The unbonded, flexible pipe as claimed in claim 1, wherein said jacket is perforated.

12. The unbonded, flexible pipe as claimed in claim 1, wherein said thermally insulating cover and said jacket are non-foamed.

13. The unbonded, flexible pipe as claimed in claim 1, wherein said thermally insulating cover has a thermally insulating cover thickness of at least about 5 mm.

14. The unbonded, flexible pipe as claimed in claim 1, wherein said outer sealing sheath has an outer sealing sheath thickness and said thermally insulating cover has a thermally insulating cover thickness, said thermally insulating cover thickness being larger than said outer sealing sheath thickness.

15. The unbonded, flexible pipe as claimed in claim 1, wherein said jacket has a jacket thickness and said thermally insulating cover has a thermally insulating cover thickness, said thermally insulating cover thickness being larger than said jacket thickness.

16. The unbonded, flexible pipe as claimed in claim 1, wherein said jacket and said thermally insulating cover comprise a non-bonded interface such that water can penetrate into said non-bonded interface.

17. An unbonded, flexible pipe as claimed in claim 1, wherein said insulated length section of the unbonded, flexible pipe has a length of at least about 50 m.

18. An unbonded, flexible pipe as claimed in claim 1, wherein said insulated length section of the unbonded, flexible pipe has a length of up to about 90% of the pipe.

19. The unbonded, flexible pipe as claimed in claim 1, wherein said unbonded, flexible pipe comprises two or more insulated length sections.

20. The unbonded, flexible pipe as claimed in claim 1, wherein said unbonded, flexible pipe comprises a first and a second end, said insulated length section comprises a thermally insulating cover having a first end closer to the first end of the unbonded, flexible pipe and a second end closer to the second end of the unbonded, flexible pipe, said first end of said thermally insulating cover being terminated at a distance from at least one of said first end and said second end of said unbonded, flexible pipe.

21. The unbonded, flexible pipe as claimed in claim 1, wherein said unbonded, flexible pipe comprises a first and a second end, said jacket having a first end closer to the first end of the unbonded, flexible pipe and a second end closer to the second end of the unbonded, flexible pipe, said first end of said jacket being terminated at a distance from at least one of said first end and said second end of said unbonded, flexible pipe.

22. The unbonded, flexible pipe as claimed in claim 1, wherein said unbonded, flexible pipe comprises a first and a second end, said jacket and said thermally insulating cover, respectively, having first ends closer to the first end of the unbonded, flexible pipe and second ends closer to the second end of the unbonded, flexible pipe, said jacket extending beyond the first and the second end of said thermally insulating cover.

23. The unbonded, flexible pipe as claimed in claim 1, wherein said insulated length section of the unbonded, flexible pipe constitutes substantially the whole length of the pipe.

24. The unbonded, flexible pipe as claimed in claim 1, wherein said unbonded, flexible pipe comprises a first and a second end, at least one of said first and said second end is connected to an end fitting such that one or more of the layers of the unbonded, flexible pipe are independently fixed to the end fitting, said outer sealing sheath being fixed to said end fitting in an end section of said outer sealing sheath and said thermally insulating cover and said jacket diverging from said outer sealing sheath at said end section of said outer sealing sheath.

25. The unbonded, flexible pipe as claimed in claim 1, wherein said unbonded, flexible pipe comprises a first and a second end, at least one of said first and said second end is connected to an end fitting such that one or more of the layers of the unbonded, flexible pipe are independently fixed to the end fitting, said thermally insulating cover is not fixed to provide a firm connection to said end fitting.

\* \* \* \* \*

UNITED STATES PATENT AND TRADEMARK OFFICE
CERTIFICATE OF CORRECTION

PATENT NO. : 9,057,465 B2
APPLICATION NO. : 13/518916
DATED : June 16, 2015
INVENTOR(S) : Kristian Glejbol Page 1 of 1

It is certified that error appears in the above-identified patent and that said Letters Patent is hereby corrected as shown below:

In the specification, column 6, line 20, please replace "$C_{24}H_{SO}$" with -- $C_{24}H_{50}$ --

Signed and Sealed this
Tenth Day of November, 2015

Michelle K. Lee
*Director of the United States Patent and Trademark Office*